United States Patent
Woolfork

(10) Patent No.: US 10,468,047 B2
(45) Date of Patent: *Nov. 5, 2019

(54) WIRELESS DIGITAL AUDIO MUSIC SYSTEM

(71) Applicant: C. Earl Woolfork, Pasadena, CA (US)

(72) Inventor: C. Earl Woolfork, Pasadena, CA (US)

(73) Assignee: ONE-E-WAY, INC., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/185,786

(22) Filed: Nov. 9, 2018

(65) Prior Publication Data

US 2019/0098393 A1    Mar. 28, 2019

Related U.S. Application Data

(63) Continuation of application No. 15/003,242, filed on Jan. 21, 2016, now Pat. No. 10,129,627, which is a
(Continued)

(51) Int. Cl.
| | |
|---|---|
| *G10L 19/16* | (2013.01) |
| *H04R 5/00* | (2006.01) |
| *H04R 1/10* | (2006.01) |
| *G10L 19/005* | (2013.01) |

(Continued)

(52) U.S. Cl.
CPC .......... *G10L 19/167* (2013.01); *G10L 19/005* (2013.01); *G10L 25/33* (2013.01);
(Continued)

(58) Field of Classification Search
CPC .... H04R 1/083; H04R 2420/07; H04R 5/003; H04M 1/6066; H04N 21/4363;
(Continued)

(56) References Cited

U.S. PATENT DOCUMENTS 5,175,558 A * 12/1992 DuPree .............. G01S 7/36
342/378
5,491,839 A *  2/1996 Schotz .............. H04B 1/04
381/79

(Continued)

OTHER PUBLICATIONS

Bluetooth—The universal radio interface for ad hoc, wireless connectivity; Jaap Haartsen, Ericsson Review No. 2, 1998 (Year: 1998).*

(Continued)

*Primary Examiner* — Andrew C Flanders
(74) *Attorney, Agent, or Firm* — Knobbe Martens Olson & Bear, LLP

(57) ABSTRACT

A wireless digital audio system includes a portable audio source with a digital audio transmitter operatively coupled thereto and an audio receiver operatively coupled to a headphone set. The audio receiver is configured for digital wireless communication with the audio transmitter. The digital audio receiver utilizes fuzzy logic to optimize digital signal processing. Each of the digital audio transmitter and receiver is configured for code division multiple access (CDMA) communication. The wireless digital audio system allows private audio enjoyment without interference from other users of independent wireless digital transmitters and receivers sharing the same space.

20 Claims, 3 Drawing Sheets

Related U.S. Application Data continuation of application No. 13/775,754, filed on Feb. 25, 2013, now Pat. No. 9,282,396, which is a continuation of application No. 13/356,949, filed on Jan. 24, 2012, now Pat. No. 9,107,000, which is a continuation of application No. 12/940,747, filed on Nov. 5, 2010, now Pat. No. 8,131,391, which is a continuation of application No. 12/570,343, filed on Sep. 30, 2009, now Pat. No. 7,865,258, which is a continuation of application No. 12/144,729, filed on Jul. 12, 2008, now Pat. No. 7,684,885, which is a continuation of application No. 10/648,012, filed on Aug. 26, 2003, now Pat. No. 7,412,294, which is a continuation-in-part of application No. 10/027,391, filed on Dec. 21, 2001, now abandoned.

(51) Int. Cl.
*H04B 1/707* (2011.01)
*G10L 25/33* (2013.01)
*H04R 3/04* (2006.01)
*H04L 25/03* (2006.01)

(52) U.S. Cl.
CPC .......... *H04B 1/707* (2013.01); *H04R 1/1041* (2013.01); *H04R 3/04* (2013.01); *H04R 5/00* (2013.01); *H04L 25/03006* (2013.01); *H04R 2420/07* (2013.01)

(58) Field of Classification Search
CPC ........... H04N 21/43637; H04W 84/18; H04W 88/06; H04H 20/95; G10L 19/167
See application file for complete search history.

(56) References Cited

U.S. PATENT DOCUMENTS

| | | | |
|---|---|---|---|
| 5,530,929 A | 5/1996 | Lindqvist et al. | |
| 5,771,441 A * | 6/1998 | Altstatt | H01Q 1/24 343/718 |
| 5,946,343 A * | 8/1999 | Schotz | H04B 1/04 375/141 |
| 5,970,058 A | 10/1999 | DeClerk et al. | |
| 6,212,282 B1 | 4/2001 | Mershon | |
| 6,418,558 B1 * | 7/2002 | Roberts | G06F 17/14 725/129 |
| 6,563,892 B1 * | 5/2003 | Haartsen | H04L 25/03254 375/346 |
| 6,678,892 B1 * | 1/2004 | Lavelle | G06F 3/1423 348/837 |
| 7,047,474 B2 * | 5/2006 | Rhee | H03M 13/1515 714/755 |
| 7,099,413 B2 * | 8/2006 | Chuang | H04L 25/0204 370/210 |
| 2001/0025358 A1 * | 9/2001 | Eidson | H03M 13/09 714/752 |
| 2001/0033621 A1 * | 10/2001 | Khayrallah | H03M 7/3002 375/244 |
| 2002/0065043 A1 * | 5/2002 | Hamada | H04W 28/06 455/41.3 |
| 2002/0181415 A1 * | 12/2002 | West | H04L 67/36 370/312 |
| 2003/0045235 A1 * | 3/2003 | Mooney | H04M 1/6066 455/41.1 |
| 2004/0223622 A1 * | 11/2004 | Lindemann | H04R 5/04 381/79 |

OTHER PUBLICATIONS

Mashhour et al., "On the Direct Conversion Receiver—A Tutorial", Microwave J., Jun. 1, 2001, http://www.microwavejournal.com/articles/print/3226-on-the-direct-conversion-receiver-a-tutorial, accessed on Dec. 3, 2018, in 12 pages.

Petition for Inter Partes Review of U.S. Pat. No. 9,282,396, *Sony Corporation* v. *One-E-Way, Inc.*, Case No. IPR2016-01638, as filed Aug. 19, 2016, 59 pages.
Patent Owner One-E-Way's Preliminary Response to Petition for Inter Partes Review of U.S. Pat. No. 9,282,396, *Sony Corporation* v. *One-E-Way, Inc.*, Case No. IPR2016-01638, as filed Nov. 25, 2016, 20 pages.
Petitioner's Reply to Patent Owner's Preliminary Response to Petition for Inter Partes Review of U.S. Pat. No. 9,282,396, *Sony Corporation* v. *One-E-Way, Inc.*, Case No. IPR2016-01638, as filed Feb. 8, 2017, 11 pages.
Decision Instituting Inter Partes Review of U.S. Pat. No. 9,282,396, *Sony Corporation* v. *One-E-Way, Inc.*, Case No. IPR2016-01638, as filed Feb. 22, 2017, 19 pages.
Index to Exhibits, *Sony Corporation* v. *One-E-Way, Inc.*, Case No. IPR2016-01638, as filed May 22, 2017, 2 pages.
Patent Owner Response to Petition for Inter Partes Review of U.S. Pat. No. 9,282,396, *Sony Corporation* v. *One-E-Way, Inc.*, Case No. IPR2016-01638, as filed Jun. 2, 2017, 55 pages.
Reply in Support of Petition for Inter Partes Review of U.S. Pat. No. 9,282,396, *Sony Corporation* v. *One-E-Way, Inc.*, Case No. IPR2016-01638, as filed Aug. 25, 2017, 23 pages.
Record of Oral Hearing Held Nov. 6, 2017, *Sony Corporation* v. *One-E-Way, Inc.*, Case No. IPR2016-01638 and Case No. IPR2016-01639, Nov. 6, 2017, 71 pages.
Exhibit 1008 Comparison of 2001 Application Specification and 2003 Application Specification as Originally Filed, *Sony Corporation* v. *One-E-Way, Inc.*, Case No. IPR2016-01638, 9 pages.
Exhibit 1009 Comparison of Figures from 2001 Application and 2003 Application as Originally Filed, *Sony Corporation* v. *One-E-Way, Inc.*, Case No. IPR2016-01638, 3 pages.
Exhibit 1010 Comparison of 2003 Application Specification as Originally Filed and Issued U.S. Pat. No. 7,412,294, *Sony Corporation* v. *One-E-Way, Inc.*, Case No. IPR2016-01638, 19 pages.
Exhibit 1011 Comparison of 2008 Application Specification and Specification of U.S. Pat. No. 9,282,396 as Originally Filed, *Sony Corporation* v. *One-E-Way, Inc.*, Case No. IPR2016-01638, 9 pages.
Exhibit 1012 John T. Moring Aug. 18, 2016 Signed Declaration, *Sony Corporation* v. *One-E-Way, Inc.*, Case No. IPR2016-01638, 29 pages.
Exhibit 1013 Order No. 12: Construing Terms of the Asserted Patents in the matter of Certain Consumer Electronics and Display Devices With Graphics Processing and Graphics Processing Units Therein, *Sony Corporation* v. *One-E-Way, Inc.*, Case No. IPR2016-01638, 49 pages.
Petitioner's Presentation for Case No. IPR2016-01638 and Case No. IPR2016-01638, *Sony Corporation* v. *One-E-Way, Inc.*, dated Nov. 6, 2017, 62 pages.
Patent Owner's Oral Hearing Presentation for Case No. IPR2016-01638, *Sony Corporation* v. *One-E-Way, Inc.*, dated Nov. 6, 2017, 24 pages.
Patent Owner's Oral Hearing Presentation for Case No. IPR2016-01639, *Sony Corporation* v. *One-E-Way, Inc.*, dated Nov. 6, 2017, 18 pages.
Petition for Inter Partes Review of U.S. Pat. No. 9,282,396, *Sony Corporation* v. *One-E-Way, Inc.*, Case No. IPR2016-01639, as filed Aug. 19, 2016, 85 pages.
Patent Owner One-E-Way's Preliminary Response to Petition for Inter Partes Review, *Sony Corporation* v. *One-E-Way, Inc.*, Case No. IPR2016-01639, as filed Nov. 25, 2016, 70 pages.
Decision Instituting Inter Partes Review of U.S. Pat. No. 9,282,396, *Sony Corporation* v. *One-E-Way, Inc.*, Case No. IPR2016-01639, as filed Feb. 22, 2017, 26 pages.
Index to Exhibits, *Sony Corporation* v. *One-E-Way, Inc.*, Case No. IPR2016-01639, as filed May 22, 2017, 3 pages.
Patent Owner's Response to Petition for Inter Partes Review of U.S. Pat. No. 9,282,396, *Sony Corporation* v. *One-E-Way, Inc.*, Case No. IPR2016-01639, as filed Jun. 2, 2017, 62 pages.
Reply in Support of Petition for Inter Partes Review of U.S. Pat. No. 9,282,396, *Sony Corporation* v. *One-E-Way, Inc.*, Case No. IPR2016-01639, as filed Aug. 25, 2017, 24 pages.
Exhibit 1006 U.S. Pat. No. 6,563,892, *Sony Corporation* v. *One-E-Way, Inc.*, Case No. IPR2016-01639, 17 pages.

(56) References Cited

OTHER PUBLICATIONS

Exhibit 1007 Haartsen Article regarding Bluetooth—The Universal Radio (1998), *Sony Corporation v. One-E-Way, Inc.*, Case No. IPR2016-01639, 10 pages.
Exhibit 1008 Haartsen, The Bluetooth Radio System (2000), *Sony Corporation v. One-E-Way, Inc.*, Case No. IPR2016-01639, 12 pages.
Exhibit 1009 Giannakis Article regarding Load-Adaptive MUI ISI-Resilient, *Sony Corporation v. One-E-Way, Inc.*, Case No. IPR2016-01639, 14 pages.
Exhibit 1013 John Moring Aug. 18, 2016 Signed Declaration, *Sony Corporation v. One-E-Way, Inc.*, Case No. IPR2016-01639, 67 pages.
Exhibit 1015 Sony Direct Infringement Claim Charts, *Sony Corporation v. One-E-Way, Inc.*, Case No. IPR2016-01639, 140 pages.
Exhibit 1017 U.S. Pat. No. 5,530,929, *Sony Corporation v. One-E-Way, Inc.*, Case No. IPR2016-01639, 4 pages.
Exhibit 2001 Joseph C. McAlexander III, P.E., Signed Declaration and CV, *Sony Corporation v. One-E-Way, Inc.*, Case No. IPR2016-01639, 34 pages.
Exhibit 2002 Zhou Frequency-Hopped Paper, *Sony Corporation v. One-E-Way, Inc.*, Case No. IPR2016-01639, 5 pages.
Exhibit 2003 Fredman Paper, *Sony Corporation v. One-E-Way, Inc.*, Case No. IPR2016-01639, 6 pages.
Exhibit 2004 Lee Paper, *Sony Corporation v. One-E-Way, Inc.*, Case No. IPR2016-01639, 7 pages.
Exhibit 2006 Transcript of Deposition Held May 24, 2017, *Sony Corporation v. One-E-Way, Inc.*, Case No. IPR2016-01639, 98 pages.
Exhibit 2007 Supplemental Declaration by Joseph C. McAlexander, P.E., *Sony Corporation v. One-E-Way, Inc.*, Case No. IPR2016-01639, 9 pages.
Petition for Inter Partes Review of U.S. Pat. No. 7,865,258, *Sony Corporation v. One-E-Way, Inc.*, Case No. IPR2018-00216, as filed Nov. 22, 2017, 59 pages.
Petitioner's Exhibit List, *Sony Corporation v. One-E-Way, Inc.*, Case No. IPR2018-00216, as filed Nov. 22, 2017, 1 page.
Exhibit 1012 Moring Declaration dated Nov. 21, 2017, *Sony Corporation v. One-E-Way, Inc.*, Case No. IPR2018-00216, 30 pages.
Petition for Inter Partes Review of U.S. Pat. No. 7,865,258, *Sony Corporation v. One-E-Way, Inc.*, Case No. IPR2018-00217, as filed Nov. 22, 2017, 70 pages.
Petitioner's Exhibit List, *Sony Corporation v. One-E-Way, Inc.*, Case No. IPR2018-00217, as filed Nov. 22, 2017, 1 page.
Exhibit 1012 Moring Declaration dated Nov. 17, 2017, *Sony Corporation v. One-E-Way, Inc.*, Case No. IPR2018-00217, 63 pages.
Petition for Inter Partes Review of U.S. Pat. No. 8,131,391, *Sony Corporation v. One-E-Way, Inc.*, Case No. IPR2018-00218, as filed Nov. 22, 2017, 61 pages.
Petitioner's Exhibit List, *Sony Corporation v. One-E-Way, Inc.*, Case No. IPR2018-00218, as filed Nov. 22, 2017, 1 page.
Exhibit 1012 Moring Declaration dated Nov. 21, 2017, *Sony Corporation v. One-E-Way, Inc.*, Case No. IPR2018-00218, 32 pages.
Petition for Inter Partes Review of U.S. Pat. No. 8,131,391, *Sony Corporation v. One-E-Way, Inc.*, Case No. IPR2018-00219, as filed Nov. 22, 2017, 74 pages.
Petitioner's Exhibit List, *Sony Corporation v. One-E-Way, Inc.*, Case No. IPR2018-00219, as filed Nov. 22, 2017, 1 page.
Exhibit 1012 Moring Declaration dated Nov. 17, 2017, *Sony Corporation v. One-E-Way, Inc.*, Case No. IPR2018-00219, 67 pages.

* cited by examiner

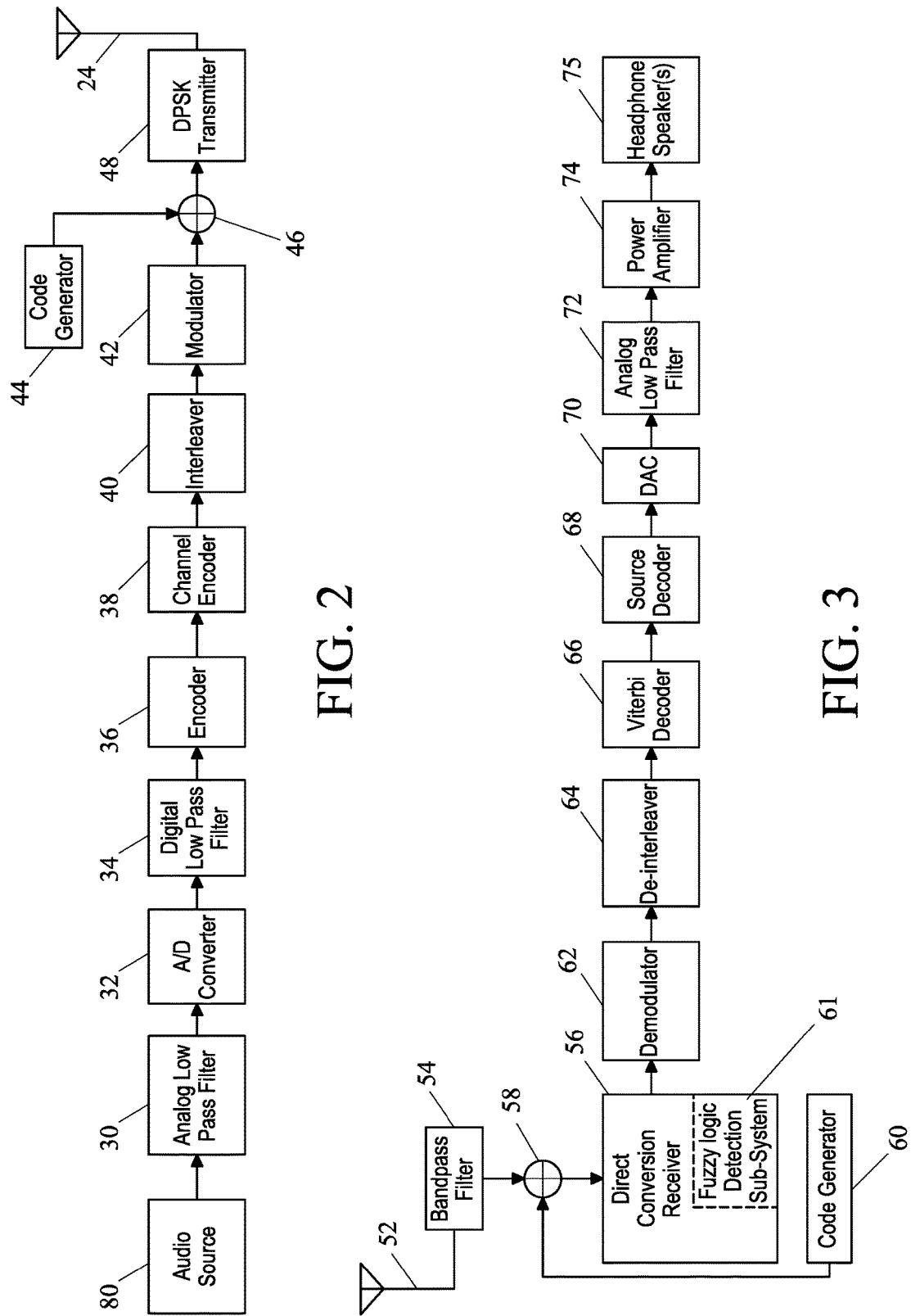

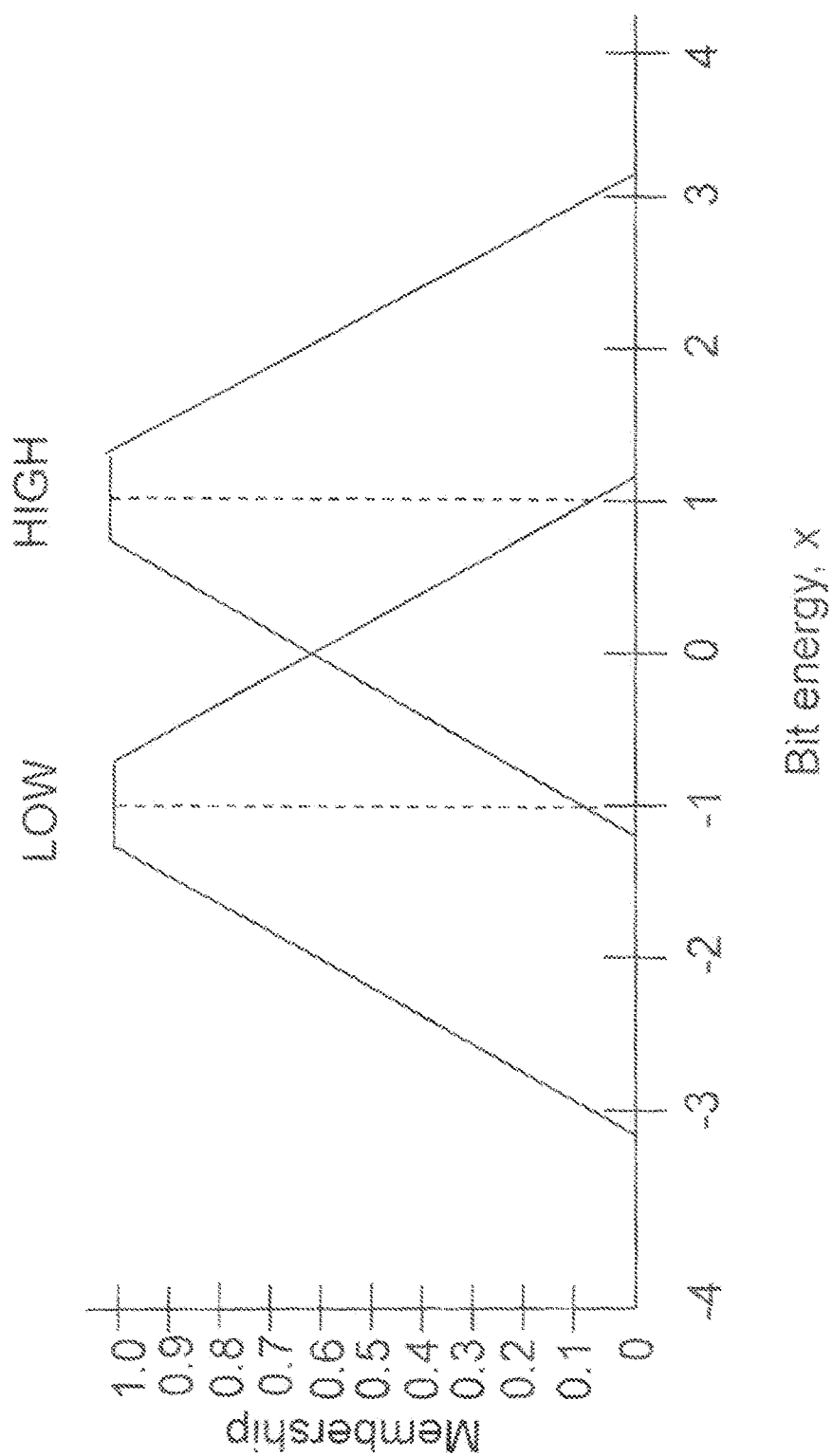

WIRELESS DIGITAL AUDIO MUSIC SYSTEM

INCORPORATION BY REFERENCE TO ANY PRIORITY APPLICATIONS

This application is a continuation of U.S. application Ser. No. 15/003,242, filed Jan. 21, 2016, which is a continuation of U.S. application Ser. No. 13/775,754, filed Feb. 25, 2013, now U.S. Pat. No. 9,282,396, which is a continuation of U.S. application Ser. No. 13/356,949, filed Jan. 24, 2012, now U.S. Pat. No. 9,107,000, which is a continuation of U.S. application Ser. No. 12/940,747, filed Nov. 5, 2010, now U.S. Pat. No. 8,131,391, which is a continuation of U.S. application Ser. No. 12/570,343, filed Sep. 30, 2009, now U.S. Pat. No. 7,865,258, which is a continuation of U.S. application Ser. No. 12/144,729, filed Jul. 12, 2008, now U.S. Pat. No. 7,684,885, which is a continuation of U.S. application Ser. No. 10/648,012, filed Aug. 26, 2003, now U.S. Pat. No. 7,412,294, which is a continuation of U.S. application Ser. No. 10/027,391, filed Dec. 21, 2001, published under US 2003/0118196 A1 on Jun. 26, 2003, now abandoned, the entireties of which are incorporated herein by reference.

BACKGROUND OF THE INVENTION

This invention relates to audio player devices and more particularly to systems that include headphone listening devices. The new audio system uses an existing headphone jack (i.e., this is the standard analog headphone jack that connects to wired headphones) of a music audio player (i.e., portable CD player, portable cassette player, portable A.M./F.M. radio, laptop/desktop computer, portable MP3 player, and the like) to connect a battery powered transmitter for wireless transmission of a signal to a set of battery powered receiving headphones.

There are also known wireless headphones that may receive A.M. and F.M. radio transmissions. However, they do not allow use of a simple plug in (i.e., plug in to the existing analog audio headphone jack) battery powered transmitter for connection to any music audio player device jack, such as the above mentioned music audio player devices, for coded wireless transmission and reception by headphones of audio music for private listening without interference where multiple users occupying the same space are operating wireless transmission devices. Existing audio systems make use of electrical wire connections between the audio source and the headphones to accomplish private listening to multiple users.

There is a need for a battery powered simple connection system for existing music audio player devices (i.e., the previously mentioned music devices), to allow coded digital wireless transmission (using a battery powered transmitter) to a headphone receiver (using a battery powered receiver headphones) that accomplishes private listening to multiple users occupying the same space without the use of wires.

SUMMARY OF THE INVENTION

The present invention is generally directed to a wireless digital audio system for coded digital transmission of an audio signal from any audio player with an analog headphone jack to a receiver headphone located away from the audio player. Fuzzy logic technology may be utilized by the system to enhance bit detection. A battery-powered digital transmitter may include a headphone plug in communication with any suitable music audio source. For reception, a battery-powered headphone receiver may use embedded fuzzy logic to enhance user code bit detection. Fuzzy logic detection may be used to enhance user code bit detection during decoding of the transmitted audio signal. The wireless digital audio music system provides private listening without interference from other users or wireless devices and without the use of conventional cable connections.

These and other features, aspects and advantages of the present invention will become better understood with reference to the following drawings, description and claims.

BRIEF DESCRIPTION OF THE DRAWINGS

Some aspects of the present invention are generally shown by way of reference to the accompanying drawings in which:

FIG. 2 is a block diagram of an audio transmitter portion of the wireless digital audio system of FIG. 1;

FIG. 3 is a block diagram of an audio receiver portion of the wireless digital audio system of FIG. 1; and FIG. 4 is an exemplary graph showing the utilization of an embedded fuzzy logic coding algorithm according to one embodiment of the present invention.

DETAILED DESCRIPTION

Figure 1:
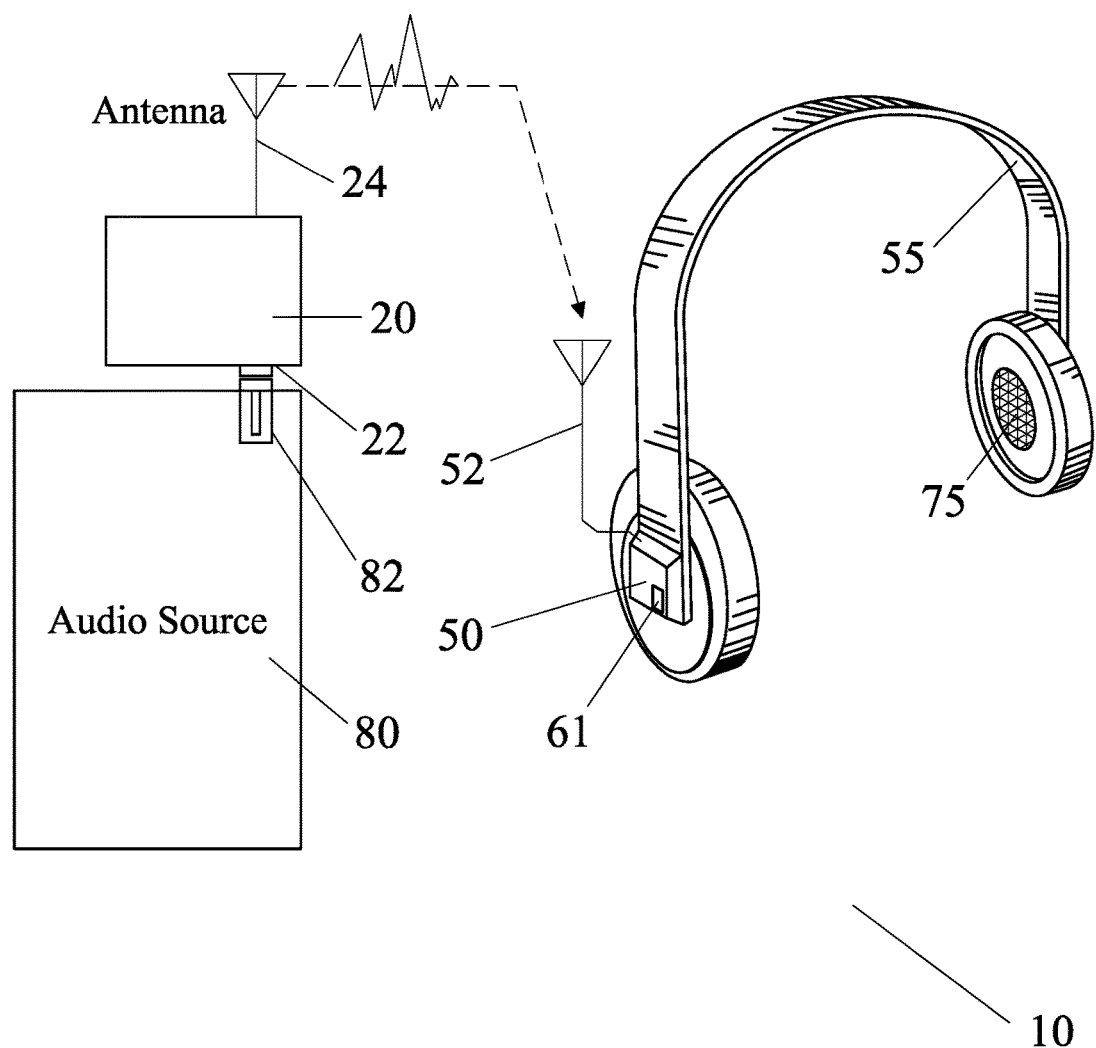
FIG. 1 schematically illustrates a wireless digital audio system in accordance with the present invention.

The following detailed description is the best currently contemplated modes for carrying out the invention. The description is not to be taken in a limiting sense, but is made merely for the purpose of illustrating the general principles of the invention.

Referring to FIGS. 1 through 3, a wireless digital audio music system 10 may include a battery powered transmitter 20 connected to a portable music audio player or music audio source 80. The battery powered wireless digital audio music transmitter 20 utilizes an analog to digital converter or ADC 32 and may be connected to the music audio source 80 analog headphone jack 82 using a headphone plug 22. The battery powered transmitter 20 may have a transmitting antenna 24 that may be omni-directional for transmitting a spread spectrum modulated signal to a receiving antenna 52 of a battery powered headphone receiver 50. The battery powered receiver 50 may have headphone speakers 75 in headphones 55 for listening to the spread spectrum demodulated and decoded communication signal. In the headphone receiver 50, fuzzy logic detection may be used to optimize reception of the received user code. The transmitter 20 may digitize the audio signal using ADC 32. The digitized signal may be processed downstream by an encoder 36. After digital conversion, the digital signal may be processed by a digital low pass filter. To reduce the effects of channel noise, the battery powered transmitter 20 may use a channel encoder 38. A modulator 42 modulates the digital signal to be transmitted. For further noise immunity, a spread spectrum DPSK (differential phase shift key) transmitter or module 48, is utilized. The battery powered transmitter 20 may contain a code generator 44 that may be used to create a unique user code. The unique user code generated is specifically associated with one wireless digital audio system user, and it is the only code recognized by the battery powered headphone receiver 50 operated by a particular user. The radio frequency (RF) spectrum utilized (as taken from the Industrial, Scientific and Medical (ISM) band) may be approximately 2.4 GHz. The power radiated by the transmitter adheres to the ISM standard.

Particularly, the received spread spectrum signal may be communicated to a 2.4 GHz direct conversion receiver or module 56. Referring to FIGS. 1 through 4, the spread spectrum modulated signal from transmit antenna 24 may be received by receiving antenna 52 and then processed by spread spectrum direct conversion receiver or module 56 with a receiver code generator 60 that contains the same transmitted unique code, in the battery powered receiver 50 headphones. The transmitted signal from antenna 24 may be received by receiving antenna 52 and communicated to a wideband bandpass filter (BPF). The battery powered receiver 50 may utilize embedded fuzzy logic 61 (as graphically depicted in FIGS. 1, 4) to optimize the bit detection of the received user code. The down converted output signal of direct conversion receiver or module 56 may be summed by receiver summing element 58 with a receiver code generator 60 signal. The receiver code generator 60 may contain the same unique wireless transmission of a signal code word that was transmitted by audio transmitter 20 specific to a particular user. Other code words from wireless digital audio systems 10 may appear as noise to audio receiver 50. This may also be true for other device transmitted wireless signals operating in the wireless digital audio spectrum of digital audio system 10. This code division multiple access (CDMA) may be used to provide each user independent audible enjoyment. The resulting summed digital signal from receiving summary element 58 and direct conversion receiver or module 56 may be processed by a 64-Ary demodulator 62 to demodulate the signal elements modulated in the audio transmitter 20. A block deinterleaver 64 may then decode the bits of the digital signal encoded in the block interleaver 40. Following such, a Viterbi decoder 66 may be used to decode the bits encoded by the channel encoder 38 in audio transmitter 20. A source decoder 68 may further decode the coding applied by encoder 36.

Each receiver headphone 50 user may be able to listen (privately) to high fidelity audio music, using any of the audio devices listed previously, without the use of wires, and without interference from any other receiver headphone 50 user, even when operated within a shared space. The fuzzy logic detection technique 61 used in the receiver 50 could provide greater user separation through optimizing code division in the headphone receiver.

The battery powered transmitter 20 sends the audio music information to the battery powered receiver 50 in digital packet format. These packets may flow to create a digital bit stream rate less than or equal to 1.0 Mbps.

The user code bits in each packet may be received and detected by a fuzzy logic detection sub-system 61 (as an option) embedded in the headphone receiver 50 to optimize audio receiver performance. For each consecutive packet received, the fuzzy logic detection sub-system 61 may compute a conditional density with respect to the context and fuzziness of the user code vector, i.e., the received code bits in each packet. Fuzziness may describe the ambiguity of the high (I)/low (0 or −1) event in the received user code within the packet. The fuzzy logic detection sub-system 61 may measure the degree to which a high/low bit occurs in the user code vector, which produces a low probability of bit error in the presence of noise. The fuzzy logic detection sub-system 61 may use a set of if-then rules to map the user code bit inputs to validation outputs. These rules may be developed as if-then statements.

Fuzzy logic detection sub-system 61 in battery-powered headphone receiver 50 utilizes the if-then fuzzy set to map the received user code bits into two values: a low (0 or −1) and a high (1). Thus, as the user code bits are received, the "if" rules map the signal bit energy to the fuzzy set low value to some degree and to the fuzzy set high value to some degree. FIG. 4 graphically shows that x-value −1 equals the maximum low bit energy representation and x-value 1 equals the maximum high bit energy representation. Due to additive noise, the user code bit energy may have some membership to a low and high as represented in FIG. 4. The if-part fuzzy set may determine if each bit in the user code, for every received packet, has a greater membership to a high bit representation or a low bit representation. The more a user code bit energy fits into the high or low representation, the closer its subsethood, i.e., a measure of the membership degree to which a set may be a subset of another set, may be to one.

The if-then rule parts that make up the fuzzy logic detection sub-system 61 must be followed by a defuzzifying operation. This operation reduces the aforementioned fuzzy set to a bit energy representation (i.e., −1 or 1) that is received by the transmitted packet. Fuzzy logic detection sub-system 61 may be used in battery-powered headphone receiver 50 to enhance overall system performance.

The next step may process the digital signal to return the signal to analog or base band format for use in powering speaker(s) 75. A digital-to-analog converter 70 (DAC) may be used to transform the digital signal to an analog audio signal. An analog low pass filter 72 may be used to filter the analog audio music signal to pass a signal in the approximate 20 Hz to 20 kHz frequency range and filter other frequencies. The analog audio music signal may then be processed by a power amplifier 74 that may be optimized for powering headphone speakers 75 to provide a high quality, low distortion audio music for audible enjoyment by a user wearing headphones 55. A person skilled in the art would appreciate that some of the embodiments described hereinabove are merely illustrative of the general principles of the present invention. Other modifications or variations may be employed that are within the scope of the invention. Thus, by way of example, but not of limitation, alternative configurations may be utilized in accordance with the teachings herein. Accordingly, the drawings and description are illustrative and not meant to be a limitation thereof.

Moreover, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Thus, it is intended that the invention cover all embodiments and variations thereof as long as such embodiments and variations come within the scope of the appended claims and their equivalents.

What is claimed is:

1. A portable spread spectrum audio receiver configured to receive and store a unique user code, said portable spread spectrum receiver configured to receive wireless modulation transmissions from a spread spectrum transmitter coupled to a music audio source, said wireless modulation transmissions representative of an audio signal representation, said portable spread spectrum audio receiver comprising:

a direct conversion module configured to receive wireless modulation transmissions representative of said audio signal representation and which have been processed to reduce intersymbol interference, and wherein said portable spread spectrum audio receiver further processes said received wireless modulation transmissions for reduction of intersymbol interference;

a digital-to-analog converter (DAC) configured to provide an analog audio output signal corresponding to said audio signal representation;

a speaker configured to generate an audio signal corresponding to said analog audio output signal, wherein said generated audio signal does not include audible audio content originating from any audio signals transmitted in a spectrum used by said spread spectrum transmitter that do not originate from said spread spectrum transmitter;

wherein said portable spread spectrum audio receiver is configured to use independent code division multiple access communication and to use said unique user code to communicate with only said spread spectrum transmitter during a wireless connection;

wherein said portable spread spectrum audio receiver is further configured to perform at least one of a plurality of demodulations on at least one of said received wireless modulation transmissions, wherein said plurality of demodulations includes a differential phase shift keying (DPSK) demodulation and a non-DPSK demodulation; and wherein said further processing for reduction of intersymbol interference is separate from said performance of at least one of said plurality of demodulations.

2. The portable spread spectrum audio receiver of claim 1, wherein the portable spread spectrum audio receiver is further configured to perform said plurality of demodulations on the at least one of said received wireless modulation transmissions.

3. The portable spread spectrum audio receiver of claim 1, wherein the audio signal representation represents music.

4. The portable spread spectrum audio receiver of claim 1, wherein said analog audio output signal is capable of representing audio signals below 40 Hz and also capable of representing audio signals above 5 kHz.

5. The portable spread spectrum audio receiver of claim 1, wherein the portable spread spectrum audio receiver includes a power supply.

6. The portable spread spectrum radio receiver of claim 1, further comprising a headphone unit, wherein the headphone unit is configured to integrate the speaker and wherein the headphone unit enables a user to secure the speaker on to a head of the user.

7. The portable spread spectrum radio receiving of claim 6, wherein the headphone unit comprises a headphone strap that connects the speaker with another speaker for opposite ear.

8. A portable spread spectrum audio receiver configured to receive and store a unique user code, said portable spread spectrum receiver configured to receive wireless modulation transmissions from a spread spectrum transmitter coupled to a music audio source, said wireless modulation transmissions representative of an audio signal representation, said portable spread spectrum audio receiver configured to:

use independent code division multiple access communication and said unique user code to communicate with only said spread spectrum transmitter during a wireless connection;

receive wireless modulation transmissions representative of said audio signal representation;

process said received wireless modulation transmissions for reduction of intersymbol interference;

perform at least one of a plurality of demodulations on at least one of said received wireless modulation transmissions, wherein said plurality of demodulations includes a differential phase shift keying (DPSK) demodulation and a non-DPSK demodulation;

generate an analog audio output signal corresponding to said audio signal representation; and output an audio signal corresponding to said analog audio output signal.

9. The portable spread spectrum audio receiver of claim 8, wherein the portable spread spectrum audio receiver is further configured to perform said plurality of demodulations on the at least one of said received wireless modulation transmissions.

10. The portable spread spectrum audio receiver of claim 8, wherein, prior to being received by the portable spread spectrum audio receiver, the wireless modulation transmissions have been processed to reduce intersymbol interference.

11. The portable spread spectrum audio receiver of claim 8, wherein said analog audio output signal is capable of representing audio signals below 40 Hz and also capable of representing audio signals above 5 kHz.

12. The portable spread spectrum audio receiver of claim 8, wherein said generated audio signal does not include audible audio content originating from any audio signals transmitted in a spectrum used by said spread spectrum transmitter that do not originate from said spread spectrum transmitter.

13. The portable spread spectrum audio receiver of claim 8, wherein said processing for reduction of intersymbol interference performed by the portable spread spectrum audio receiver is separate from said performance of at least one of said plurality of demodulations.

14. The portable spread spectrum audio receiver of claim 8, wherein the portable spread spectrum audio receiver includes a power supply.

15. The portable spread spectrum radio receiver of claim 8, further comprising a headphone unit, wherein the headphone unit is configured to integrate the speaker and wherein the headphone unit enables a user to secure the speaker on to a head of the user.

16. The portable spread spectrum radio receiving of claim 15, wherein the headphone unit comprises a headphone strap that connects the speaker with another speaker for opposite ear.

17. A portable spread spectrum audio transmitter coupled to a music audio source, said transmitter configured to transmit a unique user code and wireless modulation transmissions representative of an audio signal representation, said portable spread spectrum audio transmitter configured to:

encode a first representation of an audio signal to reduce intersymbol interference associated with a transmitted representation of the audio signal;

perform at least one of a plurality of modulations on the first representation of the audio signal;

generate a modulated signal based on the performance of at least one of the plurality of modulations, wherein the plurality of modulations includes a differential phase shift keying (DPSK) modulation and a non-DPSK modulation; and use the modulated signal and independent code division multiple access communication to wirelessly transmit a transmitted representation of the audio signal.

18. The portable spread spectrum audio transmitter of claim 17, wherein said plurality of modulations are separate from the encoding and processing by the encoder.

19. The portable spread spectrum audio transmitter of claim 17, wherein the transmitted unique user code distinguishes the transmitted representation of the audio signal from other transmitted audio signals in the spread spectrum transmitter spectrum, said other transmitted audio signals not originating from said wireless digital coded audio spread spectrum transmitter.

20. The portable spread spectrum audio transmitter of claim 17, wherein the portable spread spectrum audio transmitter includes a power supply.

* * * * *